United States Patent Office 3,398,208
Patented Aug. 20, 1968

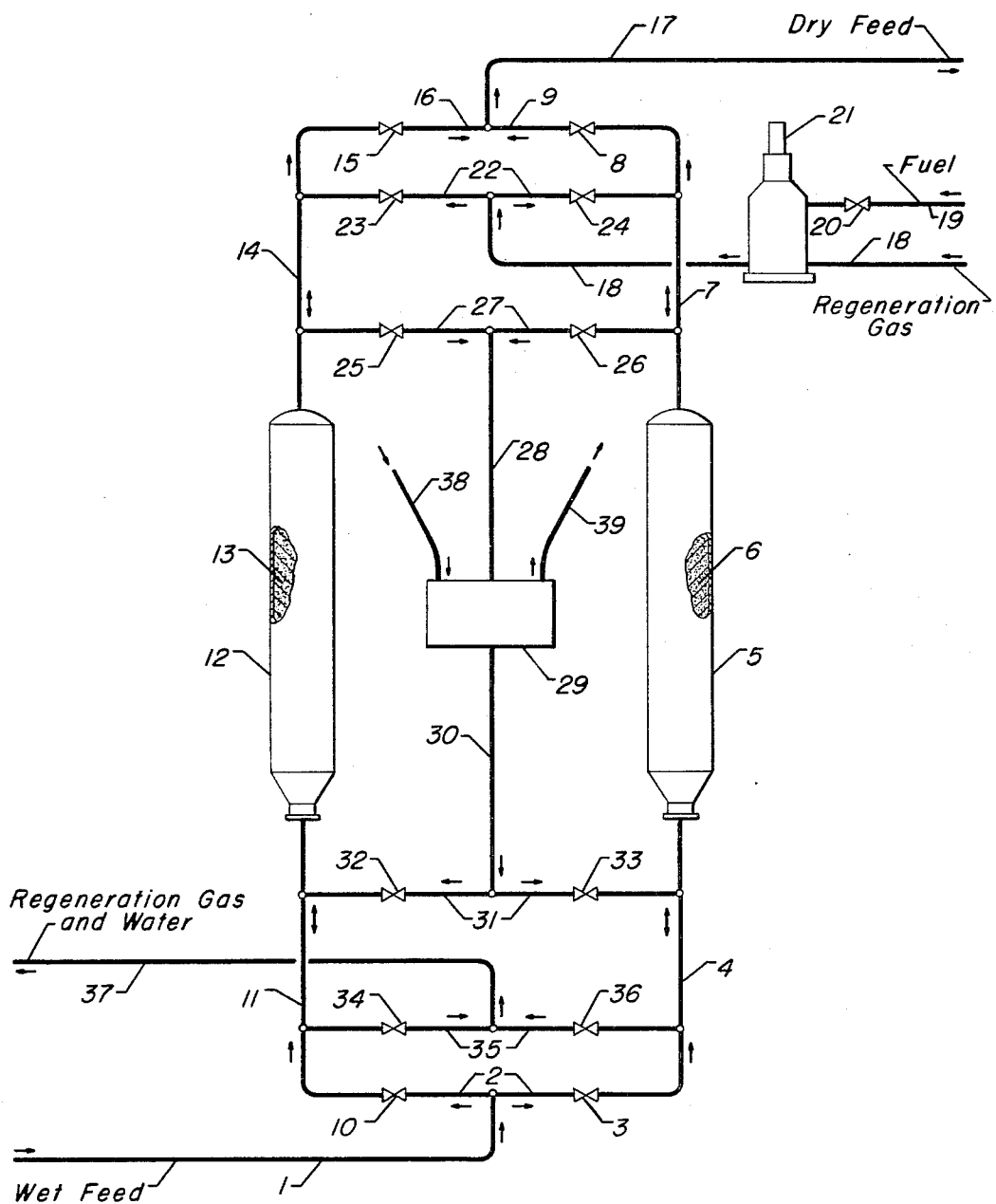

3,398,208
MOLECULAR SIEVE DRYING PROCESS
Dennis J. Ward, Lombard, Ill., assignor to Universal Oil Products Company, Des Plaines, Ill., a corporation of Delaware
Filed Mar. 29, 1965, Ser. No. 443,353
5 Claims. (Cl. 260—674)

ABSTRACT OF THE DISCLOSURE

In the drying of a wet fluid feed, such as a benzene hydrocarbon, by contact with molecular sieves wherein the molecular sieve bed is periodically regenerated with an inert stripping gas at elevated temperature and/or reduced pressure, said feed having a molecular size such that it cannot pass through the pore entrances of the molecular sieve, the method of increasing the drying rate by treating the sieves, after the regeneration step, with a fluid drying aid comprising a material having a sufficiently small molecular size to pass through the pore entrances and which is soluble in the feed and is less strongly sorbed by the sieves than water. The drying aid preferably comprises a $C_3$–$C_6$ normal paraffin.

---

This invention relates to a process for drying a fluid by contact with a bed of molecular sieves. More specifically this invention relates to an improvement in a cyclic drying process in which at least two beds of sieves are alternately employed in a drying step and a regeneration step. Still more specifically this invention relates to the introduction of a drying aid into the pore structure of a sieve after the sieve has been regenerated and before the sieve is employed in the drying step in order to increase the rate of drying in the drying step.

Molecular sieves have been used in many desiccant drying operations in the past. Generally, this is accomplished by contacting the material to be dried with a bed of molecular sieves. When the bed becomes substantially saturated with water, the sieves are thereupon regenerated. Commonly, regeneration is accomplished by introducing an inert carrier material into the bed while maintaining elevated temperatures or lower pressures or both in the bed. Frequently, the inert carrier material is a gas such as nitrogen. When the material to be dried is a hydrocarbon, then other suitable inert carrier materials include methane, natural gas, etc. Typically, the drying process is made continuous by employing at least two beds of molecular sieves and using one bed for the drying step while simultaneously using the other bed for regeneration and at a later point in time switching the beds. The material to be dried is passed over a bed of regenerated molecular sieves containing in the pores the material used for regeneration, commonly the inert carrier gas. I have observed that when the material to be dried is of sufficiently small cross sectional molecular size to pass through the pore entrance of the sieve, the material and water begin to rapidly displace the regeneration gas within the pores until the pores contain primarily the material to be dried. The rate of displacement of the inert regeneration gas is sufficiently fast so as to allow the gas to form bubbles and leave the molecular sieve. This results in rapid drying of the material since the water is displacing the material to be dried from the sieve as the feed passes through the bed during the drying step. However, when the material to be dried is too large in molecular size to pass through the pore entrances of the sieve, only the water is able to pass through the pore entrance and displace the regeneration gas. This effect results in the slow sorption of water due to the adherence of the gas on the surface of the sieve thereby occluding the pore passageways. An example of this effect is illustrated by the drying of liquid hydrocarbons using a 5A molecular sieve. Normal paraffins are able to pass through the pore entrances of this sieve but benzene is not. I have observed that in a cyclic process for drying benzene in which nitrogen is employed as the regeneration gas, it is more difficult to dry the benzene to a given water level than it is to dry a hydrocarbon stream containing normal paraffins at the same drying operating conditions.

It is an object of this invention to improve the ability of molecular sieves to dry liquids having molecular sizes too large to pass through the sieve's pore entrances.

It is another object of this invention to disclose an improved molecular sieve cyclic drying process having the ability to dry all hydrocarbon feeds at a fast rate.

It is another more specific object of this invention to displace the regeneration gas from the pore structure of a molecular sieve with a drying aid liquid before contacting the sieve with a feed to be dried.

These and other objects will become more apparent in the light of the following detailed description.

The accompanying figure is a flow scheme of a preferable manner in accomplishing the process of this invention. Vessels 5 and 12 containing molecular sieve beds 6 and 13, respectively, are operated on the swing bed principle wherein one bed is employed on the drying step while the other bed is being regenerated and at a point later in time the beds are swung or switched. For purposes of the description it will be assumed that for the first portion of the cycle, bed 6 is on the drying step and bed 13 is being regenerated. During said first portion the wet feed is introduced into flow conduit 1, where it flows through flow conduit 2, valve 3, flow conduit 4 and into vessel 5. The feed contacts bed 6 wherein water is sorbed into the pore structure and the feed leaving vessel 5 through flow conduit 7 has had its water content reduced to the desired level. The dry feed flows through flow conduit 7, valve 8, flow conduit 9 and finally out through flow conduit 17. The regeneration of molecular sieve bed 13 is accomplished by a stripping step and a treating step in which a hot inert regeneration gas is passed through bed 13 for at least a portion of the stripping step in the overall regeneration cycle. This is accomplished by introducing the regeneration gas through flow conduit 18 where it passes through heater 21 continues through flow conduit 18 and flows through flow conduit 22, valve 23, flow conduit 14 and into vessel 12. Heater 21 is maintained at a high temperature for at least a portion of the regeneration step. This is accomplished by controlling the fuel to the heater in flow conduit 19 by means of valve 20. The hot regeneration gas containing desorbed water vapor leaves vessel 12 through flow conduit 11 where it passes through valve 34, flow conduit 35 and finally out flow conduit 37. When the bed 13 has been regenerated the heat in heater 21 is reduced and bed 13 is cooled off by the passage of cool regeneration gas through bed 13. Alternately the cooling can be accomplished by bypassing the regenerating gas around heater 21.

As a part of the overall regeneration cycle, after the sieves are stripped and cooled, they are exposed to a treating step which comprises the heart of this invention. The treating step is accomplished by introducing a second fluid serving as a drying aid into bed 13 by passing said second fluid through flow conduit 30, flow conduit 31, valve 32, flow conduit 11 and into vessel 12. The second fluid displaces the regeneration gas in bed 13 and the displaced gas and excess second fluid leaves vessel 12 through flow conduit 14, valve 25, flow conduit 27, flow conduit 28 and into storage vessel 29. The regeneration gas is removed from vessel 29 through flow conduit 39. When the treating step is finished (when the regeneration gas has been displaced from the pores) bed 13 is ready to be used in the drying step. Bed 6 is used for the drying step until the sieves therein are substantially saturated with water or just prior to a breakthrough of wet feed or just before the water level of the feed flowing in flow conduit 7 starts to increase depending on the criticality of the dryness of the feed. During this first portion of the cycle, valves 3 and 8 are open while valves 24, 26, 33 and 36 are closed. In the stripping step valves 23 and 34 are open and valves 10, 15, 25 and 32 are closed while in the treating step valves 23 and 34 are closed and valves 25 and 32 are opened.

When the first portion of the cycle is completed, the second and last portion of the cycle is initiated in which bed 13 is employed in the drying step and bed 6 is regenerated. The wet feed is introduced into flow conduit 1, where it flows through flow conduit 2, valve 10, flow conduit 11 and into vessel 12. The feed contacts bed 13 wherein water is sorbed into the pore structure and the feed leaving vessel 12 through flow conduit 14 has had its water content reduced to the desired level. The dry feed flows through flow conduit 14, valve 15, flow conduit 16 and finally out through flow conduit 17.

Again the regeneration of bed 6 is accomplished by a stripping step and a treating step as described hereinbefore. In this stripping step, the regeneration gas passes through flow conduit 18, flow conduit 22, valve 24, flow conduit 7 and into vessel 5. The regeneration gas containing desorbed water vapor leaves vessel 5 through flow conduit 4 where it passes through valve 36, flow conduit 35 and finally out flow conduit 37. When the stripping step is completed, the treating step is started by closing valves 24 and 36 while opening valves 26 and 33 and circulating the second fluid. The treating is accomplished by passing the second fluid through flow conduit 30, flow conduit 31, valve 33, flow conduit 4, vessel 5, flow conduit 7, valve 26, flow conduit 27 and finally through flow conduit 28. Since a small amount of second fluid will inevitably be lost due to solubility in the feed, etc., periodically, additional make-up second fluid is introduced into storage vessel 29 through flow conduit 38.

Other auxiliary equipment not shown in the drawing such as means for opening and closing the appropriate valves at the correct time, means for controlling the opening and closing means, a pump to circulate the second fluid, etc., must be provided in order for the process to properly function. Such auxiliary equipment has been omitted from the description in the interest of brevity and clarity and its selection is within the ordinary skill of a process and instrumentation engineer.

The second fluid described hereinbefore must possess certain properties in order to effectively function in its intended capacity. The second fluid must be of sufficiently small molecular size to pass through the pore entrances of the molecular sieve. The second fluid must be soluble in the feed to be dried. The second fluid should be less firmly adsorbed by the molecular sieve than water. An especially preferable embodiment of the present invention involves the drying of benzene with 5A molecular sieves. Benzene is too large in molecular cross sectional size to pass through the pore entrances of 5A sieves. A second fluid containing an appreciable concentration of normal paraffins is a suitable material to treat the sieves after they have been stripped. Especially preferable second fluids include the lighter hydrocarbons such as propane, butane, pentane and hexane having a concentration in excess of 20% of normal paraffins present. Normal paraffins have a sufficiently small cross sectional size to be able to pass through the pore entrances of the 5A sieves and displace the regeneration gas from the sieves. In general the lighter hydrocarbons in the $C_3$–$C_6$ carbon number range are especially preferable since they have low viscosities and can more readily pass through the pore entrances than the heavier hydrocarbons. If desired, a pure normal paraffin stream can be used as the second fluid although this is not necessary. Therefore after the 5A bed has been employed in the drying step to remove water from benzene and has been stripped of sorbed water by contact with hot regeneration gas, and cooled, the light hydrocarbon second fluid is introduced into the bed. The bed is allowed to come to equilibrium with the surrounding second fluid and the regeneration gas is entirely displaced out of the bed as hereinbefore described. The bed is now ready to be placed on the drying step whenever the beds are switched and the wet benzene reintroduced into the bed.

The choice of regeneration gas depends upon the feed to be dried. It is preferable that the gas be inert to the feed in that it not chemically react with the feed. A suitable regeneration gas to be used in conjunction with most liquids is nitrogen although other inert gases include helium, argon and neon. When the feed to be dried is a hydrocarbon, then methane, ethane, natural gas and hydrogen may be employed as the regeneration gas. Especially preferable regeneration gases for the drying of hydrocarbons such as benzene comprise natural gas, methane and nitrogen.

The operating conditions employed in the stripping step are dependent upon the manner of stripping and the moisture content of the sieves. In the drawing a hot inert regeneration gas is employed to strip the water from the sieves and reactivate the sieves. The high temperature selected for the stripping step is preferably selected within the range of from about 350° F. to about 650° F. Other methods of stripping may be used such as combining of the purging effect of the regeneration gas with low pressures. Thus, if the drying step absolute pressure is at least 3 times as great as the stripping step absolute pressure, the sieves are readily regenerated. Also a combined regeneration gas, high temperature low pressure stripping step may be employed. In all cases however, when the water has been removed from the sieves, the pores contain regeneration gas.

Generally the size of the sieve beds are designed for convenient drying times. For example in drying benzene, the amount of sieves in each bed is selected to give a time of drying of from about 1 to about 24 hours before the beds are swung. For a typical drying operation in which the amount of water in the feed is less than 1%, liquid hourly space velocities (LHSV) of from about 0.01 to about 2 may be employed.

Molecular sieve drying processes find utility in drying various liquid streams. For example, when a hydrocarbon is to be introduced into a catalytic reactor wherein the catalyst is sensitive to water, the hydrocarbon must be thoroughly dried. Thus, in the alkylation of benzene with ethylene to form ethylbenzene over a $BF_3$-alumina catalyst, the benzene must be dried to preserve the activity of the catalyst.

The following examples are included to further demonstrate the utility and operability of the present invention but it is not intended to limit the invention to the materials disclosed therein.

EXAMPLE I

An apparatus similar to that shown in the accompanying figure is constructed. Benzene containing 500 p.p.m. of water is introduced into flow conduit 1 at a rate of 500 bbl./day. The temperature of the bed on the drying step is maintained at about 100° F. A sufficient quantity of 5A molecular sieves are loaded into each bed to enable the beds to be swung every 12 hours. Natural gas is employed as the regeneration gas and is heated to a maximum temperature of about 500° F. during the stripping step. Butane, containing about 60% normals is employed as the second fluid. The process is operated as described hereinbefore and the water content of the benzene flowing in flow conduit 17 is 10 p.p.m.

EXAMPLE II

The run of Example I is repeated except no butane as a second fluid is employed. The benzene is directly introduced into the stripped sieves containing natural gas in the pores. The operating conditions are maintained identical to those used in Example I and the water content of the benzene flowing in flow conduit 17 is 150 p.p.m.

I claim as my invention:

1. In a process for drying a wet fluid feed by introducing said feed into contact with a bed of molecular sieves, said feed being characterized in that it is unable to pass through the pore entrances of said molecular sieves, the improvement which comprises:
   (a) contacting the molecular sieves with said feed until the sieves are at least partially saturated with water;
   (b) discontinuing step (a) and contacting the molecular sieves with a regeneration gas selected from the group consisting of nitrogen, helium, argon, neon, hydrogen, methane, ethane and natural gas under regenerating conditions to strip said water from the sieves;
   (c) discontinuing step (b) and contacting the molecular sieves with a fluid drying aid under conditions to displace said regeneration gas from the pores of said molecular sieves, said drying aid being soluble in said feed and consisting essentially of a paraffinic hydrocarbon having from 3 to about 6 carbon atoms, including a substantial proportion of a $C_3$–$C_6$ normal paraffin, and having a molecular size sufficiently small to pass through the pore entrances of said molecular sieves; and
   (d) discontinue step (c) and reintroducing said wet feed into contact with the thus treated molecular sieve bed.

2. The process of claim 1 further characterized in that said regeneration gas comprises nitrogen, methane or natural gas and said regenerating conditions include a temperature of from about 350° F. to about 650° F.

3. The process of claim 1 further characterized in that said regeneration gas comprises nitrogen, methane or natural gas and said regenerating conditions include a reduced pressure of not more than one-third of the absolute pressure employed in step (a).

4. The process of claim 1 further characterized in that said feed is a benzene hydrocarbon.

5. The process of claim 4 further characterized in that said feed is liquid benzene and said molecular sieves are 5A molecular sieves.

References Cited

UNITED STATES PATENTS

| | | | |
|---|---|---|---|
| 2,518,409 | 8/1950 | Williamson | 252—414 |
| 2,960,546 | 11/1960 | Nobis et al. | 260—674 |
| 2,988,503 | 6/1961 | Milton et al. | 210—24 |

OTHER REFERENCES

Petroleum Refiner, vol. 36, No. 7, pp. 136–140, July 1957.

DELBERT E. GANTZ, *Primary Examiner.*

C. E. SPRESSER, *Assistant Examiner.*